(12) United States Patent  
Kandler

(10) Patent No.: US 7,124,638 B2
(45) Date of Patent: Oct. 24, 2006

(54) PRESSURE SENSOR AND METHOD FOR DETECTING AN EFFECTIVE PRESSURE

(75) Inventor: Michael Kandler, München (DE)

(73) Assignee: Infineon Technologies AG, Munich (DE)

( * ) Notice: Subject to any disclaimer, the term of this patent is extended or adjusted under 35 U.S.C. 154(b) by 20 days.

(21) Appl. No.: 10/883,056

(22) Filed: Jul. 1, 2004

(65) Prior Publication Data

US 2005/0000293 A1 Jan. 6, 2005

(30) Foreign Application Priority Data

Jul. 1, 2003 (DE) ................................ 103 29 665

(51) Int. Cl.
*G01L 9/06* (2006.01)
(52) U.S. Cl. ...................................... 73/708
(58) Field of Classification Search .................. 73/708, 73/720, 721, 726
See application file for complete search history.

(56) References Cited

U.S. PATENT DOCUMENTS 4,689,999 A * 9/1987 Shkedi ........................ 73/708
6,293,154 B1 * 9/2001 Kurtz .......................... 73/727

FOREIGN PATENT DOCUMENTS

DE 4434318 A1 3/1996

* cited by examiner

*Primary Examiner*—Edward Lefkowitz
*Assistant Examiner*—Andre Allen
(74) *Attorney, Agent, or Firm*—Baker Botts L.L.P.

(57) ABSTRACT

A pressure sensor for detecting an effective pressure comprises a first pressure detection means for providing a first pressure measurement signal and a second pressure detection means for providing a second pressure measurement signal, wherein the first pressure measurement signal differs from the second pressure measurement signal, as well as an evaluation means for determining the effective pressure based on the first and the second pressure measurement signal. Thereby it is achieved that in a pressure measurement the measurement errors are reduced.

18 Claims, 2 Drawing Sheets

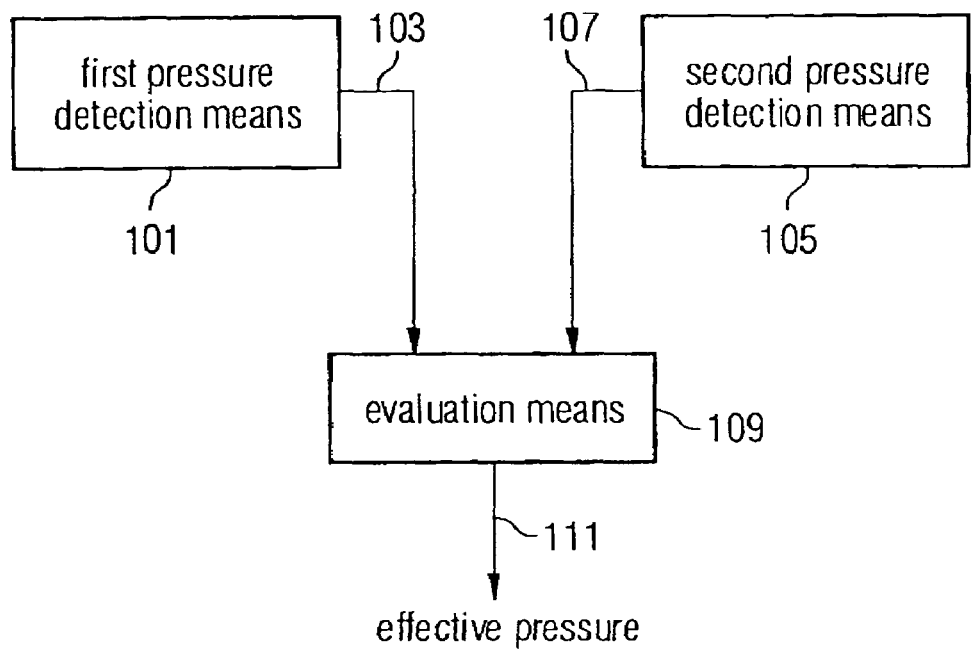
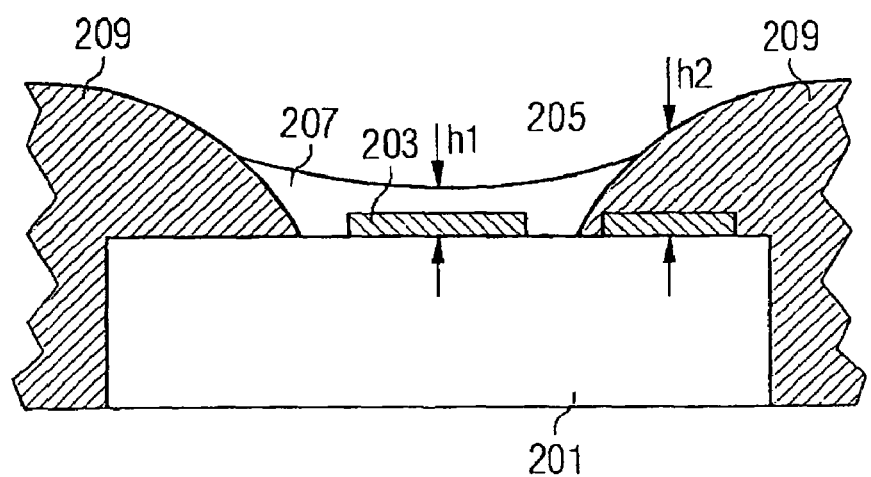

PRESSURE SENSOR AND METHOD FOR DETECTING AN EFFECTIVE PRESSURE

PRIORITY

This application claims priority to German application no. 103 29 665.4 filed Jul. 1, 2003.

TECHNICAL FIELD OF THE INVENTION

The present invention relates to a pressure sensor as well as a method for detecting an effective pressure, which can be used for detecting a tire pressure.

BACKGROUND OF THE INVENTION

For measuring pressure in a tire of an automobile, pressure sensors are used, which are installed in car tires. When an automobile is moving, centrifugal accelerations of up to 2,000 g occur in car tires. These accelerations can lead to a significant measurement error in tire pressure sensors, which are also moved in the respective tire.

Normally, the pressure sensor consists of a flexible membrane, which bends under the influence of an external pressure. This bending (deformation) is measured electronically and is a measure for the external pressure.

Due to the own weight of a membrane, an acceleration acting vertically to the membrane also leads to a bending. Particularly in surface mechanical silicon pressure sensors, which require a protective layer, such as a gel, for media separation, the effect accompanying the additional membrane bending is increased by the protective layer (media protection) deposited on the membrane, such that a significant measurement error occurs when using such sensors. Due to the acceleration acting vertically to the membrane, however, there is also a measurement error in sensors that require no protective layer. For example with sensors, which are setup in bulk micromechanic, the pressure can be brought up from the backside of the substrate, so that in sensors set-up that way mainly the own weight of the membrane is responsible for the measurement errors resulting from the acceleration.

Above that, the acceleration acting transversally to the membrane and the accompanying bending of the membrane is always dependent on a position of the tire pressure sensor in a vehicle. If the tire pressure sensor is less distant from an axis of a wheel, the centrifugal acceleration acting on the membrane is lower than in the case of a tire pressure sensor, which is further away from the axis of a wheel, since the centrifugal acceleration depends linearly on an installation radius. If, for example, tire pressure sensors are installed later, different measurements will occur if an exactly equal installation height in all tire pressure sensors is not kept, so that, for example, four different measurement values would be indicated with a tire pressure, which is equal in all four wheels, since the tire pressure sensors each respectively experience a different centrifugal acceleration. The same effect occurs also when the installation height of the respective tire pressure sensor is kept exactly and when an angle between normal on the sensor membrane and the respective wheel radius is different for each one of the tire pressure sensors. In that case, a respectively different force, which also leads to a measurement error, acts vertically on the respective membrane during acceleration.

For avoiding the above-described problem, the tire pressure sensors can already be calibrated exactly during installation, so that, for example, always the same force acts on all four sensors during acceleration. This approach, however, is expensive and difficult to be realized with a later installation of the tire sensors.

Above that, a settlement of a wheel speed in a central unit can be performed for compensating the acceleration errors. Therefore, apart from a pressure measuring value p, a wire speed $\omega$ and a sensor specific constant $\gamma$ should be known to the central unit, which indicates a corrected pressure value, and which establishes a connection between acceleration and pressure error. For a sensor setup in surface micromechanic with a gel thickness $h_1$ over a sensor cell and a gel density $\rho_1$, the following applies to the pressure measurement value p:

$$p = p_0 + a h_1 \rho_1,$$

wherein a is an acceleration normal to the membrane level and $p_0$ a real internal pressure of a tire.

The factor $\gamma$ is therefore calculated to $\gamma = h_1 \rho_1 \cos \alpha$, wherein $\alpha$ is an angle between a normal on a sensor membrane and a radius of a wheel. A centrifugal acceleration at a wheel speed $\omega$ can be determined based on the connection $a = r \omega^2$, wherein a is an installation radius.

In the above-described method, therefore, the central unit has to exactly know an installation position of the sensors. Above that, the approach is only suitable for later installed systems (after marked), when the systems can be provided with a value of the wheel speed.

SUMMARY OF THE INVENTION

It is the object of the present invention to provide an efficient concept for pressure detection.

In accordance with a first aspect, the present invention provides a pressure sensor for detecting an effective pressure, having a first pressure detection means for providing a first pressure measurement signal, which depends on the effective pressure and has a first interference dependence on interference; a second pressure detection means for providing a second pressure measurement signal, which depends on the effective pressure and has a second interference dependence on the interference, which differs from the first interference dependence; and an evaluation means for determining the effective pressure based on the first and second pressure measurement signals, the first interference dependence and the second interference dependence.

According to a second aspect, the present invention provides a method for detecting an effective pressure, comprising: generating a first pressure measurement signal, which depends on the effective pressure and has a first interference dependence on interference; generating a second pressure measurement signal, which has a second interference dependence on the effective pressure and the interference; and determining the effective pressure based on the first and second pressure measurement signals, the first interference dependence and the second interference dependence.

In accordance with a third aspect, the present invention provides a computer program with a program code for performing the above method, when the computer program runs on a computer.

The present invention is based on the knowledge that an exact pressure measurement can be performed by a pressure sensor, which has first and second pressure detection means, which each provide respectively different pressure measurement signals. If the dependencies of the first and second pressure measurement signal on an interference (such as an acceleration) and/or on an effective pressure (such as due to a respectively different pressure sensitivity of the first and second pressure detection means) are known, then the effective pressure can be determined based on the respective pressure measurement signal as well as the respective dependencies on the interference and/or the effective pressure such that an error in determining the acceleration is minimized.

According to the invention, a compensation of the acceleration is performed based on measurement data, which is much more user friendly. Thereby, the first and second pressure detection means can be integrated on a chip (on-chip). Therefore, for example apart from the actual pressure measurement cell, which is, for example, in the middle of a chip, a further pressure measurement cell is preferably integrated, which is for example at the edge of the chip. Depending on the assembly variation, either a thicker gel layer or a different compound (globetop) is above this measurement cell close to the edge in the case, for example, surface micromechanical silicon pressure sensors. Therefore, under influence of acceleration, the pressure measurement cell close to the edge will measure a different value than the central pressure measurement cell. The different reaction of the two measurement cells can now be used for an on-chip compensation of the acceleration, by using the two measurement values in an appropriate calculation.

It is an advantage of the present invention that due to two pressure detection means, which are disposed in a pressure sensor, an exact pressure measurement is possible independent of an installation position of the pressure sensor. Particularly during acceleration, its measurement value distorting effect can be efficiently compensated.

It is another advantage of the present invention that the pressure sensor can be integrated, since both the first and the second pressure detection means can be integrated on a chip. For that reason, the production and installation costs of a pressure sensor setup in that way are also low.

It is another advantage of the present invention, that the first and the second pressure detection means of the pressure sensor can be calibrated already beforehand to determine the interference dependencies of the respective pressure detection means. Thereby, the inventive pressure sensors can be calibrated already during a production process, wherein further an expensive and inaccurate sensor calibration during installation is omitted. This is particularly advantageous for later installed sensor systems, where pressure sensors are installed in already finished produced wheels, which is always connected with installation inaccuracies. According to the invention, a later calibration with later installed pressure sensors is omitted, whereby further both the assembly cost and respective measurement inaccuracies are reduced.

It is another advantage of the present invention the inventive evaluation means can also be integrated on the chip when the pressure sensor is integrated. Thereby, the requirement of installing a central unit for evaluating the respective pressure measurement signal is avoided, whereby the pressure sensor cost as well as an assembly effort can be reduced.

A further advantage of the present invention can be seen in the fact that for pressure measurement of moving objects silicon pressure sensors in surface micromechanic can be used according to the invention, since, as has already been mentioned, the possibly strong bending of the membrane due to the protective layer during acceleration can be compensated, since the possible interference dependence of the respective pressure detection means can already be determined a priory. Thus, according to the invention, a new field of application is opened up for such pressure sensors.

Another advantage of the present invention lies in the fact that already existing sensor elements can be used for producing the inventive sensor. By a possible on-chip compensation of the acceleration effects, further, the inventive pressure sensors can be used independent of the system and thus in a flexible way.

Another advantage of the present invention lies in the fact that for eliminating the effects in connection with the acceleration no additional acceleration sensor is required, since the inventive pressure sensor already has two pressure detection means.

BRIEF DESCRIPTION OF THE DRAWINGS

These and other objects and features of the present invention will become clear from the following description taken in conjunction with the accompanying drawings, in which:

FIG. 1 is a first embodiment of a pressure sensor according to the present invention;

FIG. 2 is a further embodiment of a pressure sensor according to the present invention;

DETAILED DESCRIPTION OF THE PREFERRED EMBODIMENTS

Figure 3:
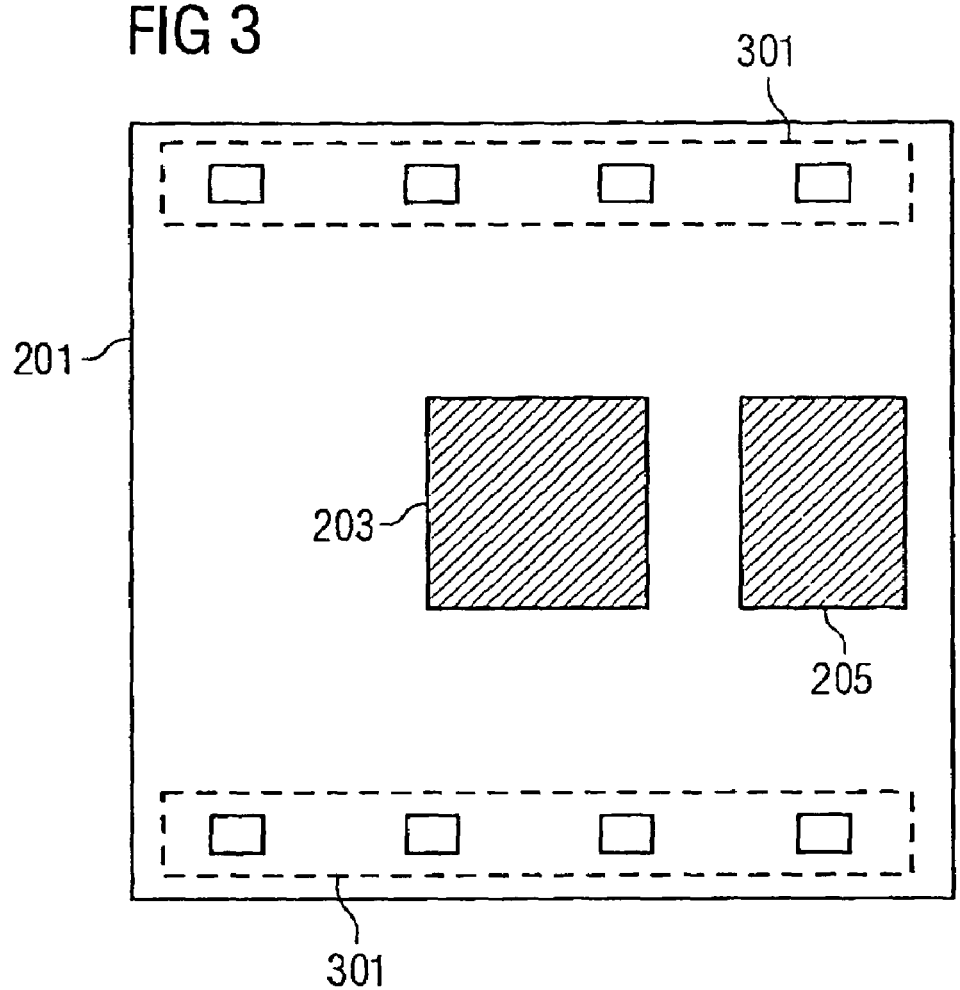
FIG. 3 is a further embodiment of a pressure sensor according to the present invention.

A first embodiment of the inventive pressure sensor is illustrated in FIG. 1. The pressure sensor comprises a first pressure detection means 101, which provides a first pressure measurement signal 103. Further, the pressure sensor has a second pressure detection means 105, which provides a second pressure measurement signal 107. Both the first pressure measurement signal 103 and the second pressure measurement signal 107 are received by an evaluation means 109. The evaluation means provides an output signal 111, which characterizes the effective pressure.

The first pressure detection means 101 is formed to measure the effective pressure. This can be realized, for example, by the fact that the first pressure detection means 101 has a first membrane, which provides the first pressure measurement signal 103 based on a deformation (such as bending) during effective pressure. Analogously, the second pressure detection means 105 is formed to detect the effective pressure, for example, with the help of a second membrane, which provides the second pressure measurement signal 107 based on a deformation during effective pressure. According to the invention, the first pressure measurement signal 103 differs from the second pressure measurement signal 107. This difference can be realized by the fact that the first pressure measurement signal 103 has a first interference dependence, for example, on the effective pressure and on interference, which can, for example, be acceleration. On the other hand, the second pressure measurement signal 107 depends also on the effective pressure and has a second interference dependence on the interference. Thereby, the evaluation means 109 determines the effective pressure based on the first and second pressure measurement signal as well as the first and the second interference dependence, which respectively differ from one another.

According to the invention, the difference between the first pressure measurement signal 103 and the second pressure measurement signal 107 can be such that the first pressure measurement signal 103 has a first effective pressure dependence on the effective pressure and an interference dependence on an interference, such as acceleration. The second pressure measurement signal 107 has a second effective pressure dependence on the effective pressure as well as the interference dependence on the interference, as it is the case with the first pressure measurement signal 103. Both the first effective pressure dependence of the first pressure measurement signal and the second effective pressure dependence of the second pressure measurement signal 107 can be realized by the fact that the first pressure detection means 101 and the second pressure detection means 105 have a different pressure sensitivity. This can, for example, be realized by the fact that the first pressure measurement means 101 has a first membrane for providing the first pressure measurement signal 103 and the second pressure detection means 105 has a second membrane for providing the second pressure measurement signal 107, wherein the first and the second membrane deform differently, for example during effective pressure.

If the first pressure measurement signal 103 has the first interference dependence on the interference and the second pressure measurement signal 107 has the second interference dependence on the interference, the evaluation means 109 is formed to determine the effective pressure based on the first and the second pressure measurement signal as well as the first and the second interference dependence. Thereby, the first and the second interference dependence can already be determined beforehand by calibrating the inventive pressure sensor, so that it is available for the evaluation means 109. If the first and the second interference dependence on the interference are known, it is always possible to compensate the interference such that the effective pressure can be determined exactly.

If the pressure sensor shown in principle in FIG. 1 is installed in a wheel of an automobile, the first pressure detection means 101 as well as the second pressure detection means 105 are adjacent, if they are integrated on a chip. Thereby, the evaluation means 109 can also be integrated on the chip. It is however, also possible that the evaluation means 109 is installed at a different location. In that case, the first pressure detection means 101 as well as the second pressure detection means 105 communicate, for example, by air interface with the evaluation means 109. Further, it is also possible that the first pressure detection means 101 and the second pressure detection means 105 are disposed spatially apart from one another, such as in a car wheel, such that they provide pressure measurement signals which respectively differ from one another.

In FIG. 2, a further embodiment of a sensor according to the present invention is illustrated. In the embodiment illustrated in FIG. 2, the case is illustrated where the pressure sensor is integrated on a chip.

The pressure sensor illustrated in FIG. 2 has a chip 201, on whose upper surface a first pressure detection means 203, which comprises, for example, a first membrane, as well as a second pressure detection means 205, which comprises for example a second membrane, are disposed. Thereby, both pressure detection means (both membranes) are spaced apart from one another. Over the first pressure detection means 203, a first elastic material 207 is disposed, which has a thickness $h_1$ as well as a first density in a region over the first pressure detection means 203. A second elastic material 209 is disposed over the second pressure detection means 205, which has a thickness $h_2$ as well as a second density in the region over the second membrane 205. Above that, the second elastic material 209 is disposed such that it encloses the chip 201 on the sides, but without covering the first elastic material 207.

The first elastic material 207 can, for example, be a gel, which is used for media separation. The second elastic material 209, however, serves for covering the pressure sensor with the exception of the region where the first elastic material 207 is disposed. The second elastic material 209 can, for example, be a globetop.

In the following, the mode of operation of the pressure sensor illustrated in FIG. 2 will be explained.

A measurement value of the first pressure detection means 203 is expressed as:

$$p_1 = p_0 + ah_1\rho_1 = p_0 + p_g,$$

wherein $p_1$ designates a measurement value, $p_0$ an effective pressure, a an acceleration of the pressure sensor, $\rho_1$ a first gel density and $p_g$ a pressure measurement error caused by the acceleration as a whole.

The measurement value of the second pressure measurement means 205 is, on the other hand, expressed as:

$$p_2 \alpha p_0 + ah_2\rho_2 = \alpha p_0 + p_g/\beta,$$

wherein $p_2$ designates a measurement value, $\rho_2$ a second gel density. The factor $\alpha$ takes into account that the second pressure measurement 205 possibly has different pressure sensitivity due to its position below the globetop 209. In other words, the factor $\alpha$ takes the pressure sensitivity of the second pressure measurement means into account.

By $$\beta = \frac{h_1 \rho_1}{h_2 \rho_2}$$

a ratio of the first interference dependence (counter) on the interference (acceleration) and the second interference dependence (denominator) on the interference is defined. Thus, with the help of factor $\beta$, the different interference dependences of the pressure detection means 203 and 205 are taken into account.

From the two measurement amounts $p_1$ and $p_2$, the corrected pressure $p_0$ (effective pressure) can be calculated:

$$p_0 = \frac{1}{1 - \alpha\beta}(p_1 - \beta \cdot p_2) = A(p_1 - \beta \cdot p_2).$$

Thereby, A is a constant which depends on $\alpha$ and $\beta$. Thus, it is sufficient for an acceleration correction to subtract the correction value $\beta p_2$ from the measurement value $p_1$. Thus, the effective pressure $p_0$ can essentially be determined based on the subtraction of the measurement amounts $p_1$ and $p_2$ weighted by $\beta$.

In the embodiment illustrated in FIG. 2, the case is illustrated where the materials disposed over the respective pressure detection means 201 and 205 have a respectively different density as well as a different thickness over the respective pressure detection means. Here, it should be noted that the thickness of the elastic material 207 and the second elastic material 209 could be identical, when the two materials differ in their density. In that case, the factor β would only provide a ratio of the first and second density.

According to the invention, however, the first elastic material and the second elastic material can be an identical material, so that no different material densities are available. If, in that case, the material thickness over the respective pressure detection means differs, the factor β provides a ratio of the two heights and is unequal 1, so that the effective pressure $p_0$ can also be determined.

If the first and the second pressure measurement cell 203 and 205 differ due to their construction in their sensitivity to the interference amount (acceleration), it is also possible according to the invention that both the densities of the elastic material disposed over the respective pressure measurement cell and their thicknesses are equal. The pressure $p_0$ can then be determined in a similar way as in the case of different materials.

Based on the above discussed examples with regard to a factor β it has been illustrated that, according to the invention, the pressure $p_0$ can always be calculated when the pressure measurement signals provided by the respective pressure measurement cell differ from one another. Thereby, it is also possible that the pressure measurement cells have the same pressure sensitivity. In that case, the factor α would become 1, so that due to the necessarily different factor β, which can be adjusted, as illustrated above, the effective pressure $p_0$ can always be calculated.

Depending on the fact whether the densities of the respective elastic material differ from one another and whether their heights are different, the first and second interference dependence changes as well. In the embodiment discussed with reference to FIG. 2, both the first and the second interference dependence depends on the respective height $h_1$ or $h_2$, as well as the first or second density of the first or second elastic material. If the first and second elastic material have respectively identical densities, the first interference dependence depends on the height $h_1$ and the second interference dependence depends on the second height $h_2$. If, analogously, the two elastic materials differ merely in their densities, i.e. they have respectively an identical height over the respective pressure measurement cell, the respective interference dependence depends on the respective density. It is, however, possible that the respective interference dependence on the interference, which is in that case the acceleration, has a different dependence, which occurs for example due to a different chip set-up. This will be the case, for example, when a further elastic material would be disposed over the first elastic material. In that case, a further additive factor would occur in the counter of the formula describing the factor β.

FIG. 3 shows a further embodiment of a pressure sensor according to the present invention. In FIG. 3, an arrangement of the first pressure detection means 203 (pressure measurement cell) as well as the second pressure detection means 205 (auxiliary cell) is illustrated exemplarily on the chip 201. The chip 201 has further terminals 301, which are, for example, provided for voltage supply as well as data exchange.

Figure 4:
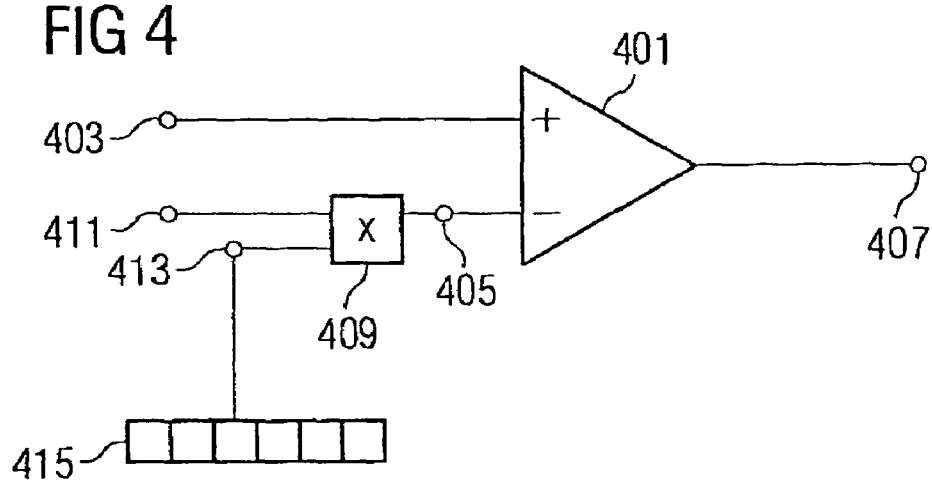
FIG. 4 is an embodiment of an evaluation means according to the present invention.

FIG. 4 shows a first embodiment of an evaluation means according to the present invention. The evaluation means comprises a subtracter 401 with a first input 403, a second input 405 as well as an output 407. An output of a multiplier 409 is coupled to the second input 405, which comprises a first multiplier input 411 and a second multiplier input 413. Above that, the evaluation means illustrated in FIG. 4 has a trim register 415, whose output is coupled to the second multiplier input 413.

In the following, the mode of operation of the evaluation means illustrated in FIG. 4 will be discussed.

The evaluation means illustrated in FIG. 4 is formed to determine the above-described formula for the pressure $p_0$. Therefore, the factor β is stored in the trim register 415 and provided to the multiplier 409. If the second pressure measurement signal $p_2$ is applied to the first multiplier input 411, the second pressure measurement signal $p_2$ weighted with β is applied to the second input 405 of the subtracter 401. If the first pressure measurement signal $p_1$ is applied to the first input 403, $p_0(1-\alpha\beta)$ appears at the output 407 of the multiplier.

Thereby, the parameter β is formed trimmably. Thus, the sensor can for example be measured in a shaker and adjusted individually, as has already been discussed above.

In the following, evaluation accuracy will be illustrated with regard to a numerical example.

If, in the following, the values summarized in the table below are assumed,

| $h_1$ | $\rho_1$ | $h_2$ | $\rho_2$ |
| --- | --- | --- | --- |
| 250 µm | 1,200 kg/m³ | 500 µm | 1,200 kg/m³ | the coefficient β is calculated to 0.5.

For an attenuation of the second pressure detection means 205 (auxiliary measurement cell), further calculations are made with a factor α=0.5, to determine the order of magnitude of the error exemplarily. Here, it should be noted that the factor α could also be determined beforehand by calibration measures. Therefore, for example, the pressure sensor is subject to a reference pressure, which enables an exact calibration of the respective pressure sensitivities. With the adapted parameter α, the evaluation means illustrated in FIG. 4 provides an output signal of 0.75 $p_0$ at its output 407.

With an acceleration of 1,750 g, the pressure error is $p_g$=1,750×10 m/s²×250×10⁻⁶ m×1,200 kg/m³=5,250 Pa=52.5 mbar.

When the gel thickness $h_1$ and the globetop thickness $h_2$ can be deposited with an accuracy of ±10%, the error could be compensated according to the invention also without an individual calibration of the coefficient β to ±20%. In the above-mentioned example, the pressure error would thus be reduced to maximally 0.2×52.5 mbar=10.5 mbar.

Depending on how the pressure sensors are formed, preferably, first a first pressure measurement signal is generated, which has a first interference dependence on the effective pressure and the interference, and a second pressure measurement signal is generated, which has a second interference dependence on the effective pressure and the interference. Alternatively, a first pressure measurement signal can be generated, which has a first effective pressure dependence on the effective pressure and an interference dependence on an interference, for example an acceleration, and a second pressure measurement signal is generated, which has a second effective pressure dependence on the effective pressure and the interference dependence on the interference, wherein the interference dependence in the first and the second pressure measurement signal can be identical. Then, the effective pressure will be determined based on the first and the second pressure measurement signal as well as based on the first interference dependence and the second interference dependence and based on the first effective pressure dependence and the second effective pressure dependence, respectively. Thereby, respectively the first interference dependence differs from the second interference dependence as well as the first effective pressure dependence from the second effective pressure dependence.

According to the invention, the evaluation means can also be formed to determine the effective pressure based on a difference of an amount depending on the first pressure measurement signal and an amount depending on the second pressure measurement signal. If, for example, both pressure detection means have different pressure sensitivities, which are both lower than 1, different to the embodiment discussed with reference to FIG. 2, the amount dependent on the first pressure measurement signal can, for example, be the first pressure measurement signal evaluated with a reciprocal of the pressure sensitivities, and the amount dependent on the second pressure measurement signal can be the second pressure measurement signal evaluated with the reciprocal of the difference of the pressure sensitivities.

Depending on the circumstances, the inventive method for detecting an effective pressure can be implemented in hardware or in software. The implementation can be performed on a digital memory medium, particularly a disc or a CD with electronically readable control signals, which can cooperate with a programmable computer system such that the respective method is executed. Thus, the invention consists generally also of a computer program product with a program code stored on a machine readable carrier for performing the inventive method when the computer program product runs on a computer. In other words, the invention can be realized as a computer program with a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

I claim:

1. A pressure sensor for detecting an effective pressure, comprising:
   a first pressure detection means for providing a first pressure measurement signal, which depends on the effective pressure and has a first dependence on an interference;
   a second pressure detection means for providing a second pressure measurement signal, which depends on the effective pressure and has a second dependence on the interference, which differs from the first dependence; and
   an evaluation means for determining the effective pressure based on the first and second pressure measurement signals, the first interference dependence and the second interference dependence,
   wherein the first pressure detection means has a first membrane and the second pressure detection means has a second membrane;
   wherein the first pressure detection means is formed to provide the first pressure measurement signal based on a deformation of the first membrane,
   wherein the second pressure detection means is formed to provide the second pressure measurement signal based on a deformation of the second membrane,
   wherein a first elastic material of a first density is disposed over the first membrane, and wherein a second elastic material of a second density is disposed over the second membrane,
   wherein the first dependence depends on a thickness of the first elastic material and the first density and wherein the second dependence depends on a thickness of the second elastic material and the second density; and
   wherein the first density is different from the second density and/or the thickness of the first elastic material is different from the thickness of the second elastic material.

2. The pressure sensor according to claim 1, wherein the first density is different from the second density and the thickness of the first elastic material is different from the thickness of the second elastic material.

3. The pressure sensor according to claim 1, wherein for the case of equal thicknesses of the first and second elastic material, the first and second density are different, and for the case that the first and the second density are equal, the thicknesses of the first and second elastic material are different.

4. The pressure sensor according to claim 1, wherein interference depends on an acceleration of the pressure sensor.

5. The pressure sensor according to claim 1, wherein the first membrane has a pressure sensitivity to effective pressure, which differs from a pressure sensitivity of the second membrane to effective pressure.

6. The pressure sensor according to claim 1, wherein the first and the second membrane of the first and the second pressure detection means have an identical pressure sensitivity to effective pressure.

7. The pressure sensor according to claim 1, wherein the first pressure detection means and the second pressure detection means are surface mechanical silicon pressure sensors.

8. The pressure sensor according to claim 1, wherein the evaluation means is formed to determine the effective pressure based on a difference of an amount depending on the first pressure measurement signal and an amount depending on the second pressure measurement signal.

9. The pressure sensor according to claim 8, wherein the amount depending on the second pressure measurement signal depends on the second pressure measurement signal as well as a ratio of the first and the second dependence.

10. The pressure sensor according to claim 1, wherein the first and second pressure detection means are integrated on a chip.

11. The pressure sensor of claim 1, wherein the first elastic material and the second elastic material are identical, and wherein the first density is equal to the second density.

12. The pressure sensor according to claim 7, wherein the first pressure detection means is disposed in the middle of the chip, and wherein the second pressure detection means is disposed at the edge of the chip.

13. The pressure sensor according to claim 7, wherein a thin gel layer is disposed above the first pressure detection means, and wherein a thick gel layer is disposed above the second pressure detection means.

14. The pressure sensor according to claim 7, wherein the first elastic material is disposed above the first pressure detection means, wherein the second elastic material is disposed above the second pressure detection means, and wherein the second elastic material is disposed such that it encloses the chip on the sides.

15. The pressure sensor according to claim 10, wherein the second elastic material encloses the chip on the sides without covering the first elastic material.

16. The pressure sensor according to claim 8, wherein the first elastic material is a gel layer and wherein the second elastic material is a globetop.

17. A chip with a pressure sensor for detecting an effective pressure, comprising:
- a first pressure detection means for providing a first pressure measurement signal, which depends on the effective pressure and has a first interfering dependence on an interference;
- a second pressure detection means for providing a second pressure measurement signal, which depends on the effective pressure and has a second interfering dependence on the interference, which differs from the first interfering dependence,
- wherein the first and second pressure measurement means are integrated on the chip; and
- an interface for communicating with an evaluation means, arranged external to the chip, for determining the effective pressure based on the first and second pressure measurement signals, the first interfering dependence and the second interfering dependence,
- wherein the first pressure detection means has a first membrane and the second pressure detection means has a second membrane;
- wherein the first pressure detection means is formed to provide the first pressure measurement signal based on a deformation of the first membrane,
- wherein the second pressure detection means is formed to provide the second pressure measurement signal based on a deformation of the second membrane,
- wherein a first elastic material of a first density is disposed over the first membrane, and wherein a second elastic material of a second density is disposed over the second membrane,
- wherein the first interfering dependence depends on a thickness of the first elastic material and the first density, and wherein the second interfering dependence depends on a thickness of the second elastic material and the second density; and
- wherein the first density is different from the second density or the thickness of the first elastic material is different from the thickness of the second elastic material.

18. A method for detecting an effective pressure, comprising:
- generating, in a first pressure detection means, a first pressure measurement signal, which depends on the effective pressure and has a first interfering dependence on an interference;
- generating, in a second pressure detection means, a second pressure measurement signal, which depends on the effective pressure and which has a second interfering dependence on the interference;
- wherein the first pressure detection means has a first membrane and the second pressure detection means has a second membrane;
- wherein the first pressure detection means is formed to provide the first pressure measurement signal based on a deformation of the first membrane,
- wherein the second pressure detection means is formed to provide the second pressure measurement signal based on a deformation of the second membrane,
- wherein a first elastic material of a first density is disposed over the first membrane, and wherein a second elastic material of a second density is disposed over the second membrane,
- wherein the first interfering dependence depends on a thickness of the first elastic material and the first density and wherein the second interfering dependence depends on a thickness of the second elastic material and the second density; and
- wherein the first density is different from the second density or the thickness of the first elastic material is different from the thickness of the second elastic material; and
- determining the effective pressure based on the first and second pressure measurement signals, the first interfering dependence and the second interfering dependence.

* * * * *